United States Patent
Lambert (10) Patent No.: US 9,143,979 B1
(45) Date of Patent: Sep. 22, 2015

(54) METHOD AND APPARATUS FOR LIMITING A NUMBER OF MOBILE DEVICES THAT CAN CONTEND FOR A TIME SLOT IN A WIRELESS NETWORK

(71) Applicant: Marvell International LTD., Hamilton (BM)

(72) Inventor: Paul A. Lambert, Mountain View, CA (US)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 14/283,585

(22) Filed: May 21, 2014

Related U.S. Application Data (60) Provisional application No. 61/836,582, filed on Jun. 18, 2013.

(51) Int. Cl.
  *H04L 12/24* (2006.01)
  *H04W 84/18* (2009.01)
  *H04W 28/02* (2009.01)
  *H04L 5/00* (2006.01)

(52) U.S. Cl.
  CPC ........... *H04W 28/0289* (2013.01); *H04L 5/003* (2013.01)

(58) Field of Classification Search
  CPC .... H04W 40/24; H04W 5/246; H04W 48/082
  USPC ....................................................... 370/235
  See application file for complete search history.

(56) References Cited

U.S. PATENT DOCUMENTS

| | | | |
|---|---|---|---|
| 2013/0003751 A1* | 1/2013 | Huse .............................. | 370/412 |
| 2013/0155905 A1* | 6/2013 | Sampath et al. .............. | 370/255 |
| 2013/0265906 A1* | 10/2013 | Abraham et al. ............. | 370/254 |
| 2013/0268654 A1* | 10/2013 | Abraham et al. ............. | 709/224 |
| 2013/0294232 A1* | 11/2013 | Segev et al. .................. | 370/230 |
| 2014/0112189 A1* | 4/2014 | Abraham et al. ............. | 370/254 |
| 2014/0321317 A1* | 10/2014 | Kasslin et al. ................ | 370/254 |

OTHER PUBLICATIONS

"Specification of the Bluetooth System" Master Table of Contents & Compliance Requirments-Covered Core Package version: 4.0; Jun. 30, 2010; 2302 Pages.

IEEE 802.11n—Mujtaba, Syed Aon "TGn Sync Proposal Technical Specification" IEEE P802.11-04/0889r6; May 18, 2005; 131 Pages.

(Continued)

*Primary Examiner* — Curtis A Alia
*Assistant Examiner* — Vanneilian Lalchinthang (57) ABSTRACT

A wireless device including a selection module to select a first discovery window in which to transmit a discovery frame. A transmit module attempts to transmit the discovery frame in the first discovery window. If the discovery frame is not transmitted in the first discovery window, a back off module backs off for one or more discovery windows subsequent to the first discovery window; and the transmit module attempts to transmit the discovery frame in a second discovery window following the backing off, and includes in the discovery frame a count representing a number of the one or more of the plurality of discovery windows to indicate a level of congestion in the network. On receiving the discovery frame, one or more wireless devices adjust respective back off times based on the count to reduce the level of congestion in the network.

20 Claims, 7 Drawing Sheets

(56) References Cited

OTHER PUBLICATIONS

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.

IEEE 802.20-2008 "IEEE Standard for Local and metropolitan area networks: Part 20: Air Interface for Mobile Broadband Wireless Access Systems Supporting Vehicular Mobility-Physical and Media Access Control Layer Specification" IEEE Computer Society; Aug. 29, 2008; 1053 Pages.

IEEE P802.11, Wireless LANs, Mar. 2012, 2793 pages.

IEEE P802.11ac/D2.1 "Draft Standard for Information Technology—Telecommunications and information exchange between systems—Local and metropolitan area networks—Specific requirements; Part 11: Wireless LAN Medium Access Control (MAC) and Physical Layer (PHY) specifications: Amendment 4: Enhancements for Very High Throughput for Operation in Bands below 6 GHz" 2012; 363 Pages.

IEEE P802.11ad/D5.0 Draft Standard for Information Technology—Telecommunications and Information Exchange Between Systems—Local and Metropolitan area networks—Specific Requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.

IEEEP802.11ah—Minyoung, Park;Wireless LANs Proposed Specification Framework for TGah; Mar. 12, 2012; 13 Pages.

* cited by examiner

METHOD AND APPARATUS FOR LIMITING A NUMBER OF MOBILE DEVICES THAT CAN CONTEND FOR A TIME SLOT IN A WIRELESS NETWORK

CROSS-REFERENCE TO RELATED APPLICATIONS

This application claims the benefit of U.S. Provisional Application No. 61/836,582, filed on Jun. 18, 2013. The entire disclosure of the application referenced above is incorporated herein by reference.

FIELD

The present disclosure relates generally to wireless networks, and more particularly to controlling congestion in discovery windows in Neighbor Awareness Networks (NANs).

BACKGROUND

Low-power communication protocols for wireless networks provide mechanisms for mobile devices to periodically sleep to conserve power and to wake up at a specific time to communicate with peer mobile devices. The mobile devices wake up regularly to participate in these communications. As the density of mobile devices increases, however, not all devices can participate in every slot of discovery and communication due to short durations of the slots and due to collisions that can be caused by contention.

Discovery and communication related transmissions of the mobile devices can be randomly distributed over a range of slots (referred to herein as "discovery slots"). Random distribution of the transmissions, however, may cause every mobile device to participate over a large range of discovery slots. Additionally, the random distribution may cause some mobile devices to participate over all discovery slots. Accordingly, randomly distributing the discovery and communication related transmissions of the mobile devices may not conserve power and may not reduce contention in the discovery slots.

SUMMARY

A wireless device comprises a selection module, a transmit module, and a back off module. The selection module is configured to select a first discovery window from a plurality of discovery windows in which to transmit a discovery frame. A discovery window is a time period in which (i) the wireless device and (ii) one or more wireless devices in a network are configured to transmit discovery frames to discover a service in the network prior to associating with each other. The transmit module is configured to attempt to transmit the discovery frame in the first discovery window. The back off module is configured to back off for one or more of the plurality of discovery windows subsequent to the first discovery window in response to the transmit module being unable to transmit the discovery frame in the first discovery window. In response to the transmit module being unable to transmit the discovery frame in the first discovery window, the transmit module is configured to (i) attempt to transmit the discovery frame in a second discovery window following the backing off of the one or more of the plurality of discovery windows, and (ii) include, in the discovery frame transmitted in the second discovery window, a count representing a number of the one or more of the plurality of discovery windows. The count indicates of a level of congestion in the network. In response to receiving the discovery frame, the one or more wireless devices in the network adjust respective back off times based on the count to reduce the level of congestion in the network.

In other features, the back off module is configured to select the one or more of the plurality of discovery windows using a linear function, an exponential function, or a pseudo-random function.

In other features, the transmit module is configured to transmit the discovery frame in a first channel, and to transmit an indication of one or more of (i) a time or (ii) a second channel where the wireless device is configured to become available to communicate subsequent to transmitting the discovery frame. The second channel is different from the first channel. The first channel and the second channel are in the same frequency band. The first channel and the second channel are in different frequency bands.

In another feature, the transmit module is configured to transmit information about the service in the discovery frame in response to the one or more wireless devices transmitting a request for the information about the service.

In other features, the transmit module is configured to (i) transmit information about the service in the discovery frame or (ii) transmit a request for the information in the discovery frame.

In other features, the wireless device further comprises a receive module and a timing module. The receive module is configured to receive one or more synchronization frames from the one or more wireless devices. The timing module is configured to determine a timing of the plurality of discovery windows based on the one or more synchronization frames received from the one or more wireless devices.

In other features, the wireless device further comprises a power saving module and a wake up module. The power saving module is configured to transition the wireless device from an active mode to a power save mode during the one or more of the plurality of discovery windows. The wake up module is configured to transition the wireless device from the power save mode to the active mode prior to the second discovery window.

In other features, the transmit module is configured to transmit the discovery frame as (i) a multicast frame to the one or more wireless devices or (ii) a unicast frame to a first wireless device of the one or more wireless devices.

In still other features, a method comprises selecting a first discovery window from a plurality of discovery windows in which to transmit a discovery frame from a wireless device. A discovery window is a time period in which (i) the wireless device and (ii) one or more wireless devices in a network are configured to transmit discovery frames to discover a service in the network prior to associating with each other. The method further comprises attempting to transmit the discovery frame in the first discovery window and backing off for one or more of the plurality of discovery windows subsequent to the first discovery window in response to being unable to transmit the discovery frame in the first discovery window. The method further comprises in response to being unable to transmit the discovery frame in the first discovery window, (i) attempting to transmit the discovery frame in a second discovery window following the backing off of the one or more of the plurality of discovery windows, and (ii) including, in the discovery frame transmitted in the second discovery window, a count representing a number of the one or more of the plurality of discovery windows. The count indicates of a level of congestion in the network. The method further comprises in response to receiving the discovery frame, adjusting respective back off times of the one or more wireless devices in the network based on the count to reduce the level of congestion in the network.

In other features, the method further comprises selecting the one or more of the plurality of discovery windows using a linear function, an exponential function, or a pseudorandom function.

In other features, the method further comprises transmitting the discovery frame in a first channel, and transmitting an indication of one or more of (i) a time or (ii) a second channel where the wireless device is configured to become available to communicate subsequent to transmitting the discovery frame. The second channel is different from the first channel. The first channel and the second channel are in the same frequency band. The first channel and the second channel are in different frequency bands.

In another feature, the method further comprises transmitting information about the service in the discovery frame in response to the one or more wireless devices transmitting a request for the information about the service.

In other features, the method further comprises transmitting information about the service in the discovery frame, or transmitting a request for the information in the discovery frame.

In other features, the method further comprises receiving one or more synchronization frames from the one or more wireless devices, and determining a timing of the plurality of discovery windows based on the one or more synchronization frames received from the one or more wireless devices.

In other features, the method further comprises transitioning the wireless device from an active mode to a power save mode during the one or more of the plurality of discovery windows, and transitioning the wireless device from the power save mode to the active mode prior to the second discovery window.

In other features, the method further comprises transmitting the discovery frame as (i) a multicast frame to the one or more wireless devices or (ii) a unicast frame to a first wireless device of the one or more wireless devices.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

The present disclosure relates to controlling congestion in discovery windows in Neighbor Awareness Networks (NANs) by limiting the number of devices that can contend during a discovery window. The present disclosure is organized as follows. Initially, an overview of NANs is presented with reference to FIGS. 1-6. Subsequently, an overview of controlling congestion in discovery windows in NANs by limiting the number of devices that can contend during a discovery window is presented. Thereafter, systems and methods for controlling congestion in discovery windows in NANs by limiting the number of devices that can contend during a discovery window are described in detail with reference to FIGS. 7 and 8. Finally, example situations of NAN uses are presented.

Social/Local/Mobile (SoLoMo) applications are a rapidly growing market that is built on increased capabilities of smartphones and tablets. Typically, location-based services query servers for information about the environment, and location knowledge is based on GPS or other location reckoning techniques. NANs, based on proximity, do not require a real-time connection to servers, GPS, or other geo-location systems, but instead use direct device-to-device communications to discover and exchange information.

NAN services offer significant advantages for mobile devices. Since discovery of local users and services in NANs is based on proximity rather than GPS, the discovery uses significantly less power than GPS-based approaches and works well indoors. NANs use direct device-to-device communications and do not require Internet connections or a communication infrastructure. NANs provide a low-power discovery mechanism that runs in the background in mobile devices to make the mobile devices "neighbor aware." NANs enable the mobile devices to efficiently discover people and services in their proximity. NANs scale effectively in dense Wi-Fi environments and can complement high-data-rate connections of Wi-Fi networks by providing information about people and services in the proximity. The discovery mechanisms defined for NANs can enhance discovery processes of the Wi-Fi networks. NANs can therefore complement Wi-Fi Alliance (WFA) technologies by providing a low-power method of continual discovery and by providing new ways to connect and exchange information.

NANs provide service-centric discovery that allows NAN devices to find out the services provided from each other directly with very low power consumption. NAN devices can distribute and acquire information without the need for connections such as associations formed with one another or with a network such as a WiFi network. Information about NAN devices and their services and users is determined in a pre-association state. NANs allow the NAN devices to run the discovery with very low duty cycle for extended periods without charging.

NANs can extend the use of Wi-Fi into applications and markets that may not have infrastructure (cellular or hotspots). NANs can enable users to use Wi-Fi applications to interact locally with friends and services in these emerging markets. NANs provide a low-power scalable mechanism to have an always-on discovery of other near-by Wi-Fi devices. The efficient discovery process allows devices to only wake on "interesting" discovered peers and then subsequently connect (e.g., using Wi-Fi Direct, Infrastructure mode) to perform a useful activity. NANs permit pre-association information to be shared in a publish/subscribe model explained below that can be used as a core building block for innovative mobile applications.

Figure 1:
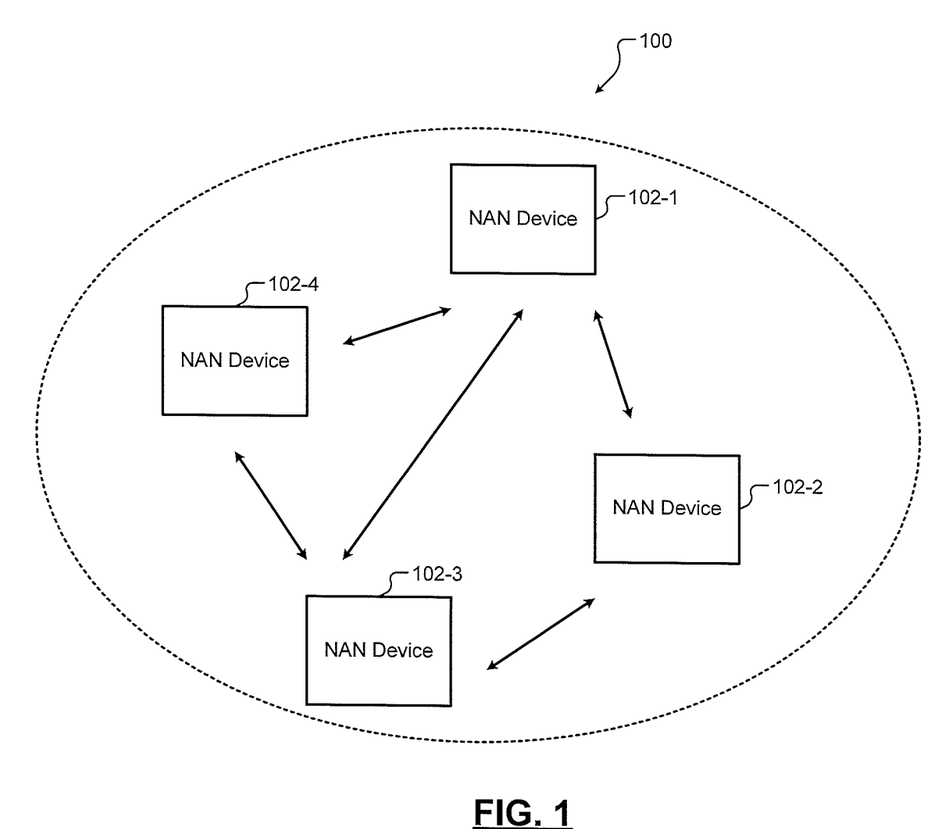
FIG. 1 shows a Neighbor Awareness Network (NAN).

FIG. 1 shows a cluster 100 of neighbor awareness network (NAN) devices. For example only, the cluster 100 is shown to include four NAN devices 102-1, 102-2, 102-3, and 102-4 (collectively NAN devices 102). The cluster 100 may include fewer or greater than four NAN devices 102. A NAN is a peer-to-peer network comprising NAN devices that share a common set of NAN parameters including a time period between consecutive discovery windows, a time duration of the discovery windows, a beacon interval, and NAN channel(s). A NAN cluster is a collection of NAN devices that are synchronized to the same discovery window schedule. A discovery window is a time and channel on which NAN devices converge. In other words, the discovery window is a recurring time period (e.g., recurring every half-a-second) during which NAN devices discover services by transmitting discovery frames. The discovery frames include publish messages and subscribe messages. A NAN device capable of providing one or more services transmits publish messages to make selected information about capabilities and services available to other NAN devices. A NAN device searching for one or more services transmits subscribe messages to gather selected types of information about capabilities and services of other NAN devices.

NAN devices operate in a 2.4 GHz frequency band and can optionally operate in a 5 GHz frequency band as defined in IEEE 802.11n and IEEE 802.11ac specifications, which are incorporated herein by reference in their entirety. A NAN device can send multicast service discovery frames to other NAN devices within range in the same NAN cluster during a discovery window. A NAN device can also send unicast service discovery frames directly to any other NAN device within range in the same NAN cluster during a discovery window. A NAN device includes a discovery engine, which is part of a NAN stack explained below, comprising publish and subscribe mechanisms. A NAN device may operate concurrently in a NAN network and other types of Wi-Fi networks such as WLAN Infrastructure, IBSS, and/or Wi-Fi Direct.

A NAN provides a mechanism for devices to synchronize the time and channel on which the devices converge to facilitate the discovery of services that have been made discoverable on existing devices or new devices that enter the NAN environment. Synchronization decreases discovery latency, power consumption, and medium occupancy that would otherwise occur. The NAN synchronization procedure is separate from the service discovery messaging. Following mutual discovery, NAN devices may establish a separate peer-to-peer network, perhaps on a different channel for further communication, for example, for file transfer, photo sharing, etc. (also called follow-up communication).

Figure 2:
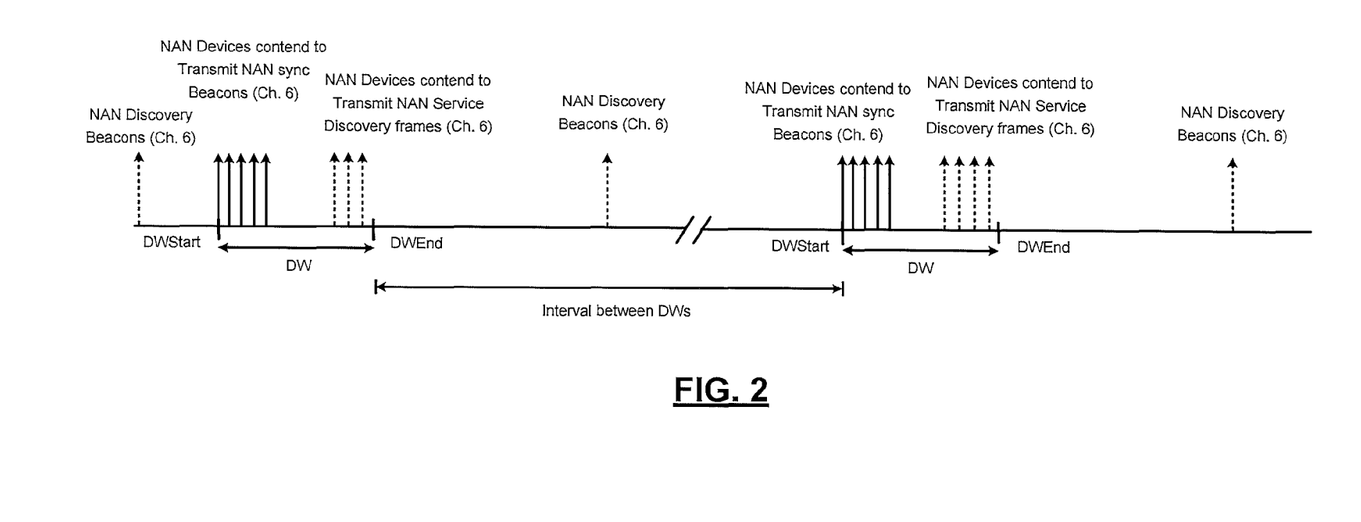
FIG. 2 shows discovery windows in the NAN of FIG. 1.

FIG. 2 shows discovery windows. The time and channel on which NAN Devices converge is called a discovery window. During a discovery window, NAN devices are available with high probabilities for mutual discovery. During interim periods between discovery windows, the devices may sleep or perform other activities (e.g., communicate on other networks), possibly on a different channel.

A NAN operates in a channel in the 2.4 GHz frequency band and, optionally, in a channel in the 5 GHz frequency band. The NAN channel in the 2.4 GHz frequency band is typically channel 6 (2.437 GHz). If a NAN device supports NAN operations in the 5 GHz frequency band, the NAN device will support a NAN channel in the 5 GHz frequency band. The NAN channel in the 5 GHz frequency band depends on the geographical location of the device and the regulatory domain rules applicable in the geographical location.

NAN devices participating in the same NAN cluster are synchronized to a common clock. A timing synchronization function (TSF) keeps timers of all NAN devices in the same NAN cluster synchronized. The TSF in a NAN cluster is implemented via a distributed algorithm that is performed by all NAN devices. Each NAN device participating in a NAN cluster transmits NAN beacon frames according to the algorithm.

A NAN device that creates a NAN cluster defines a series of Discovery window Starting Times (DWSTs) in the 2.4 GHz frequency band NAN channel. The DWSTs can be 512 time units (TUs) apart, for example. For each NAN device, time zero (0) is defined to be the first DWST in the 2.4 GHz frequency band NAN channel. A discovery window starts at each DWST. The discovery window length can be 16 TUs, for example. During a discovery window, one or more NAN devices transmit NAN synchronization beacon frames to help all NAN devices within the NAN cluster synchronize their clocks. A NAN device transmits at most one NAN synchronization beacon frame within one discovery window. Between discovery windows, one or more NAN devices transmit discovery beacon frames to help NAN devices discover the NAN cluster.

Figure 3:
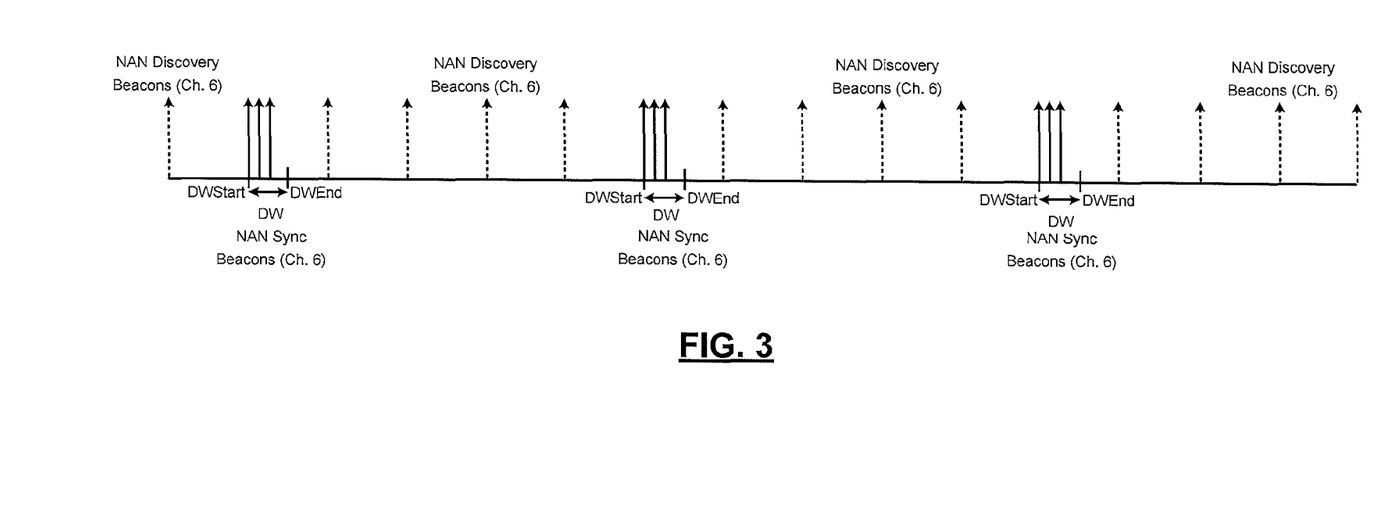
FIG. 3 shows transmission of NAN discovery and synchronization beacon frames when a NAN device is operating in the 2.4 GHz frequency band.
Figure 4:
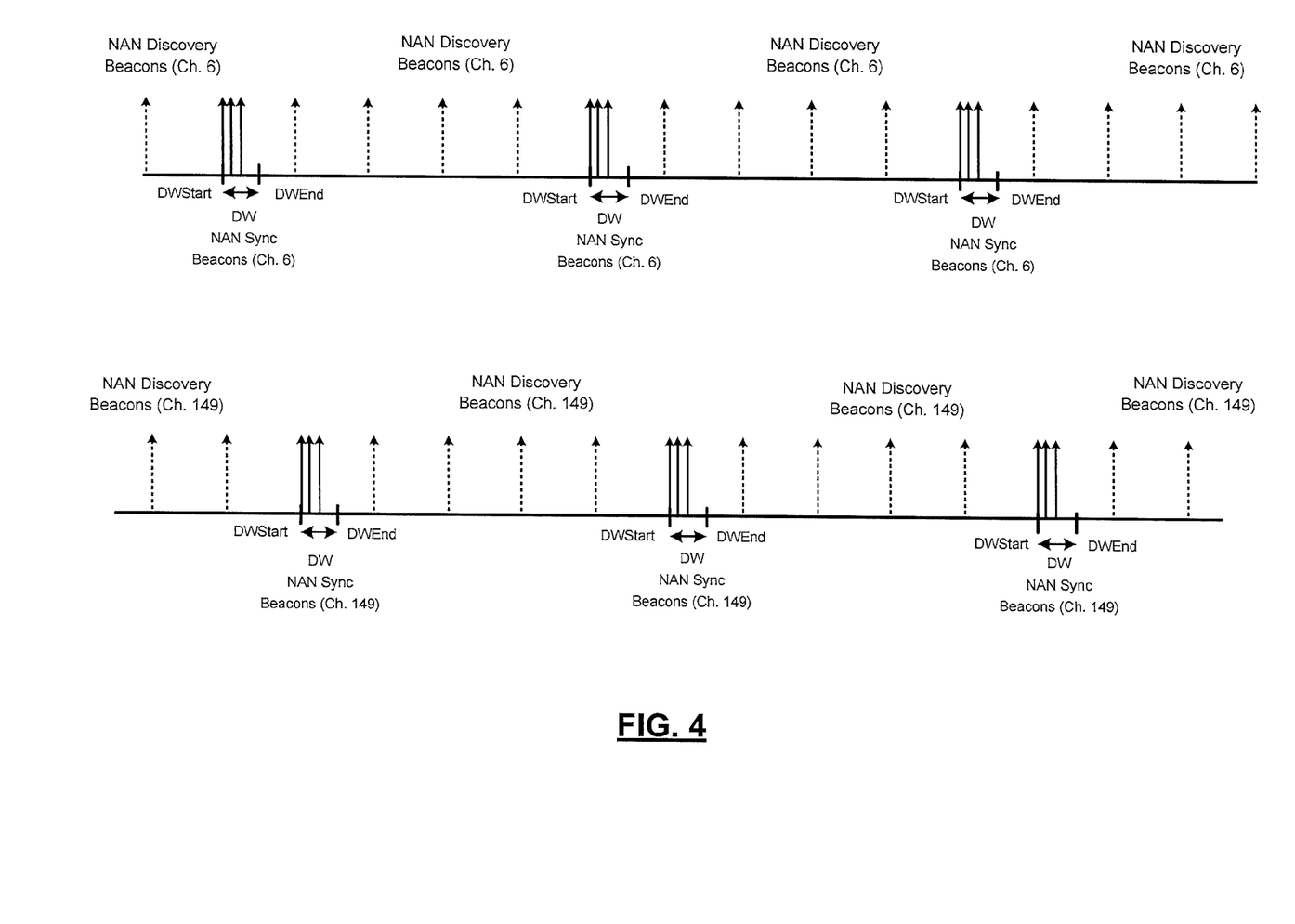
FIG. 4 shows transmission of NAN discovery and synchronization beacon frames when a NAN device is operating in the 2.4 GHz and 5 GHz frequency bands.

FIG. 3 shows transmission of NAN discovery and synchronization beacon frames when a NAN device is operating in the 2.4 GHz frequency band. FIG. 4 shows transmission of NAN discovery and synchronization beacon frames when a NAN device is operating in the 2.4 GHz and 5 GHz frequency bands.

To ensure efficient scalable transmission of frames by NAN devices in a discovery window, mechanisms are used to limit the number of NAN devices that contend during a discovery window and also to minimize collisions by devices that contend during the discovery window. A NAN device transmits one synchronization beacon in a discovery window. Multiple NAN service discovery frames may be transmitted by a NAN device in a discovery window. However, for channel efficiency reasons, a NAN device should avoid transmitting multiple service discovery frames within the same discovery window. If multiple service descriptors are available for transmission in a discovery window, the NAN device should aggregate the service descriptor attributes in a single service discovery frame.

A discovery window can accommodate a limited number of transmissions. To reduce the probability of collision when a large number of NAN devices compete for access, a NAN device that has a service discovery frame ready for transmission uses the following procedure to limit transmissions to a subset of the discovery windows. 1) A NAN device maintains a state variable TW (transmission window) initialized to zero (0). 2) The NAN device that has a new service discovery frame available for transmission chooses an integer number n from a uniform random distribution in the range [0 to TW]. 3) The NAN device begins channel access to transmit the service discovery frame at the start of the n-th discovery window, where n=0 represents the discovery window with a start time greater than the current TSF timer value. 4) If the frame transmission begins before start time of n-th discovery window+0.75*discovery window duration, then TW is set as follows: TW=max {0, (TW−1)}, and the corresponding n is chosen as in step 2 for the next service discovery frame transmission. 5) Otherwise, TW is set as follows: TW=min {16, (TW+2)}, and the corresponding n is chosen as in step 2 for the next service discovery frame transmission. This procedure allows a NAN device to transmit on average one multicast service discovery frame every TW discovery windows. A NAN device can include multiple service descriptor attributes in each multicast service discovery frame.

NAN service discovery frames enable NAN devices to look for services from other NAN devices and make services discoverable for other NAN devices. There are two NAN service discovery protocol messages defined in the NAN service discovery protocol: 1) a publish message, and 2) a subscribe message. The NAN service discovery protocol messages are carried in service descriptor attributes that are carried in the NAN service discovery frames. A NAN device may use (transmit) a NAN service discovery frame to actively look for availability of a specific service. When a NAN device uses (transmits) a subscribe message, the NAN device asks for other NAN devices operating in the same NAN cluster to transmit a publish message when response criteria are met. A NAN device may use (transmit) a publish message to make a service provided by the NAN device discoverable for other NAN devices operating in the same NAN cluster. A NAN device may use (transmit) a publish message in response to receiving a subscribe message and also in an unsolicited manner (i.e., not in response to a subscribe message). Each NAN service discovery frame may contain zero (0) or more publish messages and zero (0) or more subscribe messages. A NAN device may also indicate in the NAN service discovery frames that the NAN device will be available during intervals between discovery windows for further service discovery or post NAN discovery operations (follow-up operations). A NAN device may also indicate in the NAN service discovery frames further availability of the NAN device on more than one channel for the same or different time intervals.

Figure 5:
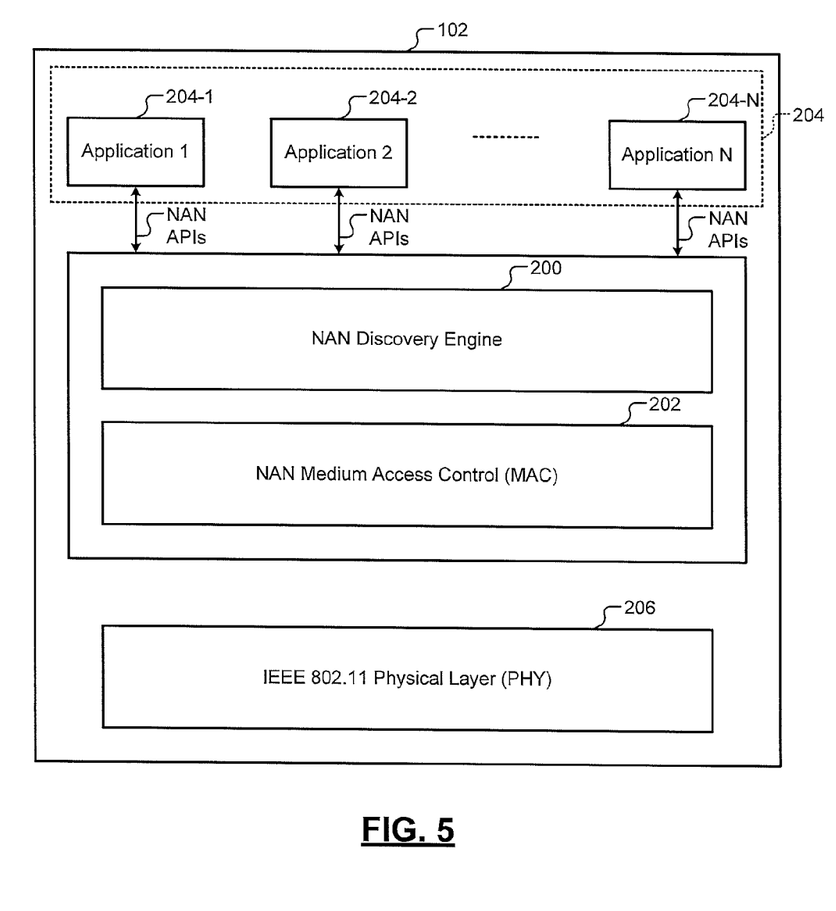
FIG. 5 shows the architecture of the NAN device 102.

FIG. 5 shows the architecture of the NAN device 102. The main components of the architecture or the NAN stack are a NAN discovery engine 200, a NAN Medium Access Control (MAC) 202, and NAN APIs to services/applications 204-1, 204-2, . . . , and 204-N (collectively applications 204). The architecture utilizes an IEEE 802.11 physical layer (PHY) 206 (e.g., an IEEE 802.11n PHY or an IEEE 802.11ac PHY). These components constitute the NAN stack. The NAN MAC 202 is a MAC with NAN support that provides MAC frame transmission and reception services for the NAN discovery engine 200. The NAN discovery engine 200 comprises publish and subscribe mechanisms and provides the mechanisms to the applications 204.

Figure 6:
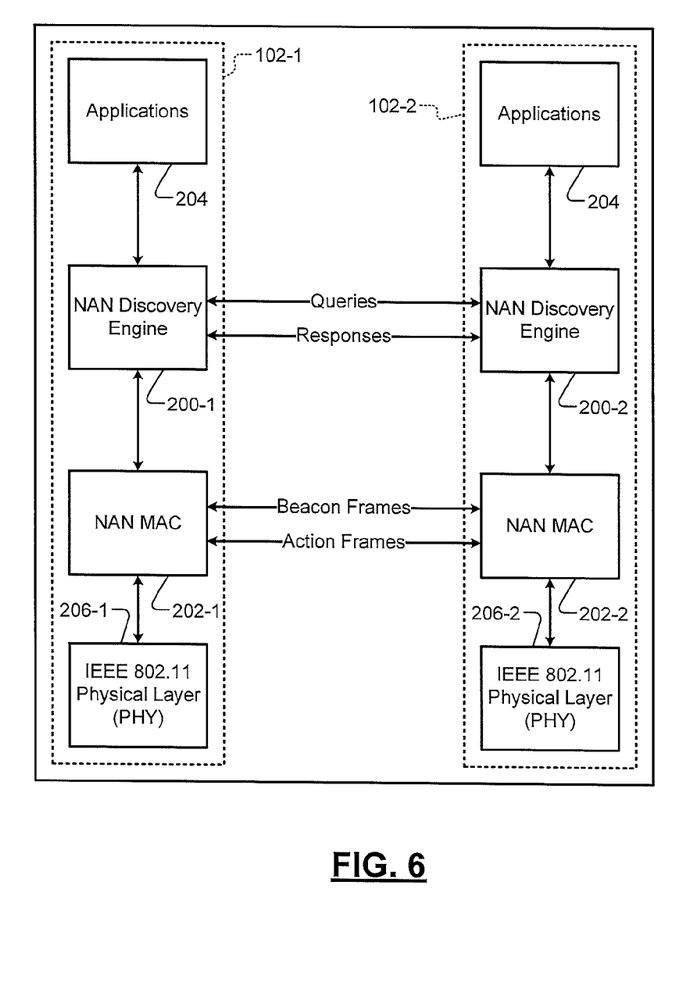
FIG. 6 shows interactions and interfaces between NAN devices and components of the NAN architecture.

FIG. 6 shows interactions and interfaces between NAN devices (e.g., 102-1 and 102-2) and the components of the NAN architecture. Service queries and responses are processed by the NAN discovery engines 200-1, 200-2. The NAN MAC components 202-1, 202-2 are responsible for processing and handling NAN beacon frames and service discovery frames.

The following is an overview of controlling congestion in discovery windows in NANs by limiting the number of devices that can contend during a discovery window. A detailed description is provided subsequently with reference to FIGS. 7 and 8. A discovery window can accommodate a limited number of transmissions based on a duration of the discovery window. To reduce the probability of collisions in case of a large number of devices contending for channel access, the devices can limit transmissions to a subset of the discovery intervals. Typically, when a device wants to transmit a discovery frame in a discovery window, the device can choose the discovery window using the following procedure.

The device maintains TW and $TW_{min}$) where TW is a discovery frame transmission window, and $TW_{min}$ is the minimum TW. The device chooses an integer number m at random in the range [$TW_{min}$ to TW]. The device schedules the discovery frame transmission in an n-th DW, where n=0 is the current DW. If the device was unable to transmit the discovery frame before a threshold time T in the n-th DW, where T=n-th DW start time+(c*length of DW), (0<c<1; e.g., c=0.75), the device increases TW by a (e.g., a=2) using equation TW=TW+a. If the device was able to transmit the discovery frame before the threshold time T in the n-th DW, the device decreases TW by b (e.g., b=1) using equation TW=max{$TW_{min}$, (TW−b)}.

This procedure, however, requires a requesting device to listen in all discovery windows. Further, all devices back off equally since no information regarding a congestion level of the network is transmitted in beacons or discovery requests. The back off process can be modified based on the congestion level of the network. For example, the value of TW can be used as an indication of the congestion level and can be transmitted in beacons or discovery requests. A receiving device can determine whether the congestion level has increased or decreased depending on whether the value of TW has increased or decreased and can adjust its back off duration accordingly.

Other methods can be used to indicate the congestion level, which can be used to adjust back off periods of devices in these networks. For example, a device can back off for a predetermined number of discovery windows, which may be selected based on a linear, exponential, or pseudorandom function. Basically, if a device is unable to transmit in a discovery window, the device attempts the transmission less often based on back off and attempts to transmit in discovery windows farther apart. The back off could be exponential or linear. The back off could be randomized using a pseudorandom function to spread transmissions between different discovery windows. When sending a discovery request, the device can include in the discovery request a count of the number of discovery windows for which the device backs off. The count serves as an indication of a congestion level in the network. Devices that receive the discovery request can plan their responses based on the indication of the congestion level in the network. Additionally, the devices that receive the discovery request can adjust their back off periods based on the indication of the congestion level in the network.

Additionally, a device attempting to discover other services or devices may include in the discovery requests an indication of subsequent availability of the device for the purpose of receiving discovery responses (and for follow up communications). For example, an indication of subsequent availability of the device may include an indication of a subsequent discovery window (and optionally channel) in which the device will be available again. Accordingly, responding devices can hold sending discovery responses until the indicated discovery window arrives. This spreads discovery messages (requests and responses) over multiple discovery windows and reduces congestion in some discovery windows. This also allows the requesting device to save power by backing off and going to sleep after transmitting a discovery request and waking up only when the indicated discovery window arrives. The indication of subsequent availability may be expressed as a function: (slot time, slot channel)=f(TSF, MAC, . . . ). For example, the function f can be a linear function such as TSF plus an offset (TSF+t), where t is an amount of time added to TSF-based real time; or (TSF+N*DW+t), where N*DW indicates skipping N discovery windows. Alternatively, the function f may be a pseudorandom function.

Figure 7:
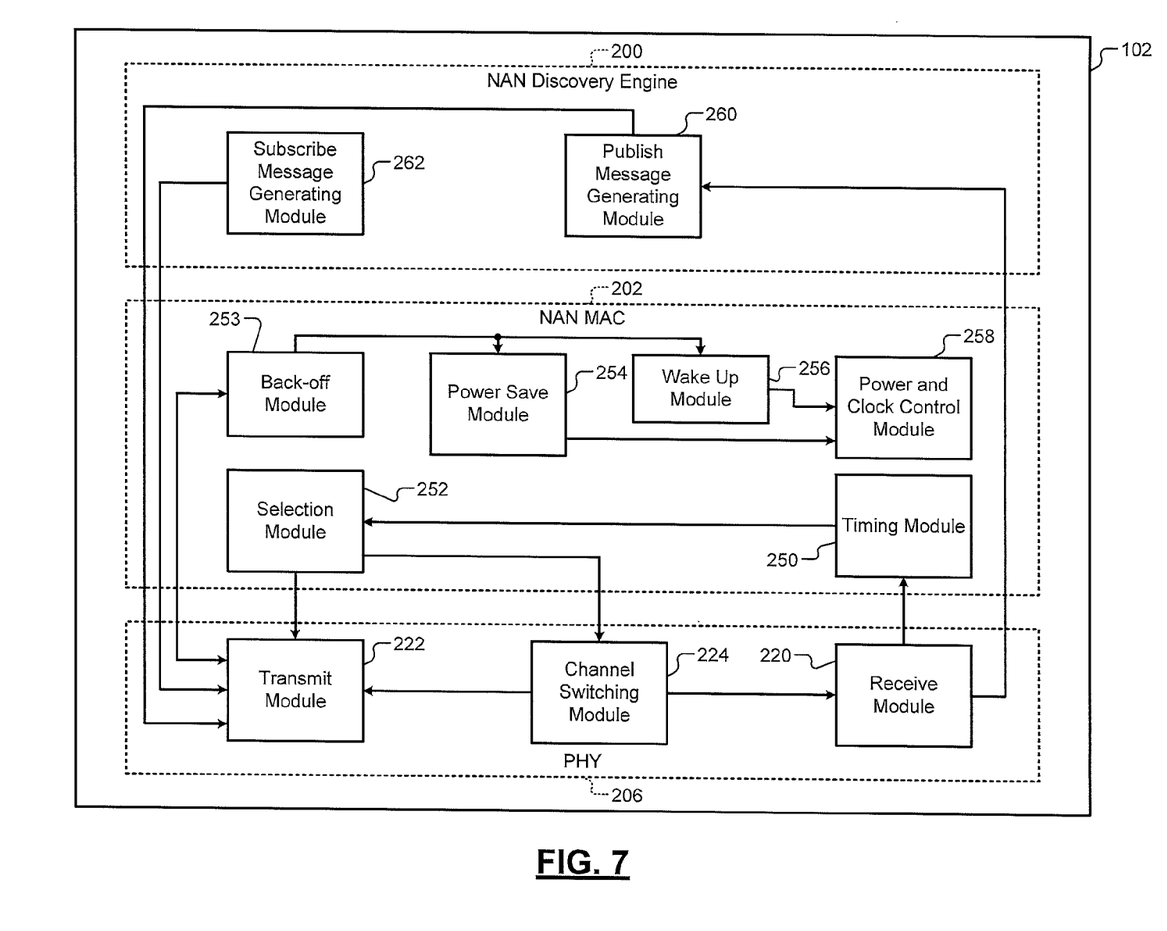
FIG. 7 shows a detailed block diagram of a NAN device employing congestion control in discovery windows in a NAN.

FIG. 7 shows a detailed block diagram of the NAN device 102 employing congestion control in discovery windows. The NAN device 102 comprises the NAN discovery engine 200, the NAN MAC 202, and the PHY 206. The PHY 206 includes a receive module 220, a transmit module 222, and a channel switching module 224. The NAN MAC 202 includes a timing module 250, a selection module 252, a back off module 253, a power save module 254, a wake up module 256, and a power and clock control module 258. The NAN discovery engine 200 includes a publish message generating module 260 and a subscribe message generating module 262.

The receive module 220 receives timing and synchronization signals such as NAN sync beacons transmitted by other NAN devices 102 in the NAN cluster 100. The timing module 250 determines a timing of the plurality of discovery windows in the NAN cluster 100 from the timing and synchronization signals received by the receive module 220. The timing of the plurality of discovery windows includes a duration or period of each discovery window and an interval between successive discovery windows (i.e., a frequency of the discovery windows).

The selection module 252 selects a discovery window from the plurality of discovery windows in which to transmit a discovery frame (e.g., discovery frame including a publish message or a discovery frame including a subscribe message). The transmit module 222 attempts to transmit the discovery frame in the selected discovery window. The transmit module 222, however, may be unable to gain access to channel in the selected discovery window because the channel may be congested due to other NAN devices 102 in the NAN cluster 100 also contending to transmit in the selected discovery window. If the transmit module 222 is unable to transmit the discovery frame in the selected discovery window, the back off module 253 aborts the attempt to transmit the discovery frame in the selected discovery window. The back off module 253 backs off, that is refrains from trying to gain access to the channel, for a predetermined number of discovery windows following the selected discovery window. That is, the back off module 253 skips the predetermined number of discovery windows following the selected discovery window. The back off module 253 selects the predetermined number of discovery windows using a linear function, an exponential function, or a pseudorandom function.

After skipping or backing off for the predetermined number of discovery windows, the transmit module 222 may retry transmitting the discovery frame. The back off module 253 monitors whether the transmit module 222 is able to transmit the discovery frame in the discovery window following the predetermined number of discovery windows. The back off module 253 adjusts the predetermined number of discovery windows (i.e., the back off time) depending on whether the transmit module 222 is able to transmit the discovery frame in the discovery window following the predetermined number of discovery windows. The back off module 253 increases the predetermined number of discovery windows if the transmit module 222 is unable to transmit the discovery frame in the discovery window following the predetermined number of discovery windows. The back off module 253 may decrease the predetermined number of discovery windows if the transmit module 222 is able to transmit the discovery frame in the discovery window following the predetermined number of discovery windows.

The transmit module 222 includes a count representing the predetermined number of discovery windows for which the NAN device 102 backs off. The count indicates a level of congestion as seen by the NAN device 102 to the other NAN devices 102 in the NAN cluster 100 that receive the discovery frame from the NAN device 102. The other NAN devices 102 in the NAN cluster 100 can adjust their back off procedure based on the count. In this manner, the level of congestion in the discovery windows in the NAN cluster 100 can exchanged among the NAN devices 102 in the NAN cluster 100 and can be controlled.

The transmit module 222 may transmit the discovery frame in a first channel in a first frequency band (e.g., channel 6 of a 2.4 GHz frequency band). In the discovery frame, in addition to the count, the transmit module 222 may also include one or more of the following indications. The transmit module 222 may include an indication that the NAN device 102 will become available for follow up communication at a predetermined time following the transmission of the discovery frame. Additionally, the transmit module 222 may include an indication that the NAN device 102 will become available for follow up communication in a second channel at the predetermined time following the transmission of the discovery frame.

For example, the first channel may be a channel (e.g., channel 6) in a 2.4 GHz frequency band. The second channel may be another channel in the 2.4 GHz frequency band or a channel in a 5 GHz frequency band. These indications help the other NAN devices 102 in the NAN cluster 100 in planning their back off procedures and their communications (e.g., transmission of their discovery frames and follow up communications). In this manner, the level of congestion in the discovery windows in the NAN cluster 100 can be controlled.

Thus, the NAN device 102 and the other NAN devices 102 in the NAN cluster 100 may exchange the indications of the level of congestion experienced by each NAN device 102 and the indications of when and where each NAN device 102 will be available for communication. Based on these indications, the transmit module 222 may transmit the discovery frame as a multicast frame directed to all the other NAN devices 102 in the NAN cluster 100 or as a unicast frame directed to a particular NAN device 102 in the NAN cluster 100. The transmit module 222 and the receive module 220 may perform follow up communications also as a multicast communication or a unicast communication. This further helps in controlling congestion in the discovery windows in the NAN cluster 100.

The discovery frame may include a publish message or a subscribe message. The discovery frame may include a publish message if the NAN device 102 wants to publish information about a service offered by the NAN device 102. The discovery frame may include a subscribe message if the NAN device 102 is searching for information about a service offered by one or more of the other NAN devices 102.

If the discovery frame includes a publish message, the transmit module 222 transmits information about a service provided by the NAN device 102 in the discovery frame. The transmit module 222 may transmit the discovery frame including the publish message in response to the receive module 220 receiving a request for the information about the service (i.e., a discovery frame including a subscribe message) from one or more of the other NAN devices 102. Alternatively, the transmit module 222 may transmit the discovery frame including the publish message in the discovery frame in an unsolicited manner, that is, without receiving a request for the information about the service (i.e., a discovery frame including a subscribe message) from one or more of the other NAN devices 102. If the NAN device 102 is searching for information about a service offered by one or more of the other NAN devices 102, the transmit module 222 may transmit the discovery frame including a subscribe message (i.e., a request for information about a service offered by one or more of the other NAN devices 102).

More specifically, the publish message generating module 260 generates a publish message including information about the service offered by the NAN device 102. The publish message generating module 260 may generate the publish message in an unsolicited manner (i.e., without receiving a subscribe message requesting the information about the service from the other NAN devices 102). Alternatively, the publish message generating module 260 may generate the publish message in response to receiving a subscribe message requesting the information about the service from the other NAN devices 102. The transmit module 222 transmits the publish message in one or more discovery windows according to the back off sequence generated by the back off module 253.

If, on the other hand, the NAN device 102 is searching for a service instead of providing the service, the subscribe message generating module 262 generates a subscribe message requesting information about the service from the other NAN devices 102. The transmit module 222 transmits the subscribe message in one or more discovery windows according to the back off sequence generated by the back off module 253.

The power save module 254 transitions the NAN device 102 from an active mode to a power save mode for the duration of the predetermined number of discovery windows in which the NAN device 102 backs off. The wake up module 256 transitions the NAN device 102 from the power save mode to the active mode prior to at the end of the back off period (i.e., at the end of the last one of the predetermined number of discovery windows. The power and clock control module 258 controls the power supply and clock(s) to one or more modules of the NAN device 102 based on signals received from the power save module 254 and the wake up module 256. In the active mode, the power and clock control module 258 supplies normal power and normal clock(s) to the modules of the NAN device 102. In the power save mode, the power and clock control module 258 supplies less than normal power or no power to one or more modules of the NAN device 102, and supplies slower than normal clock(s) or no clock(s) to one or more modules of the NAN device 102.

Figure 8:
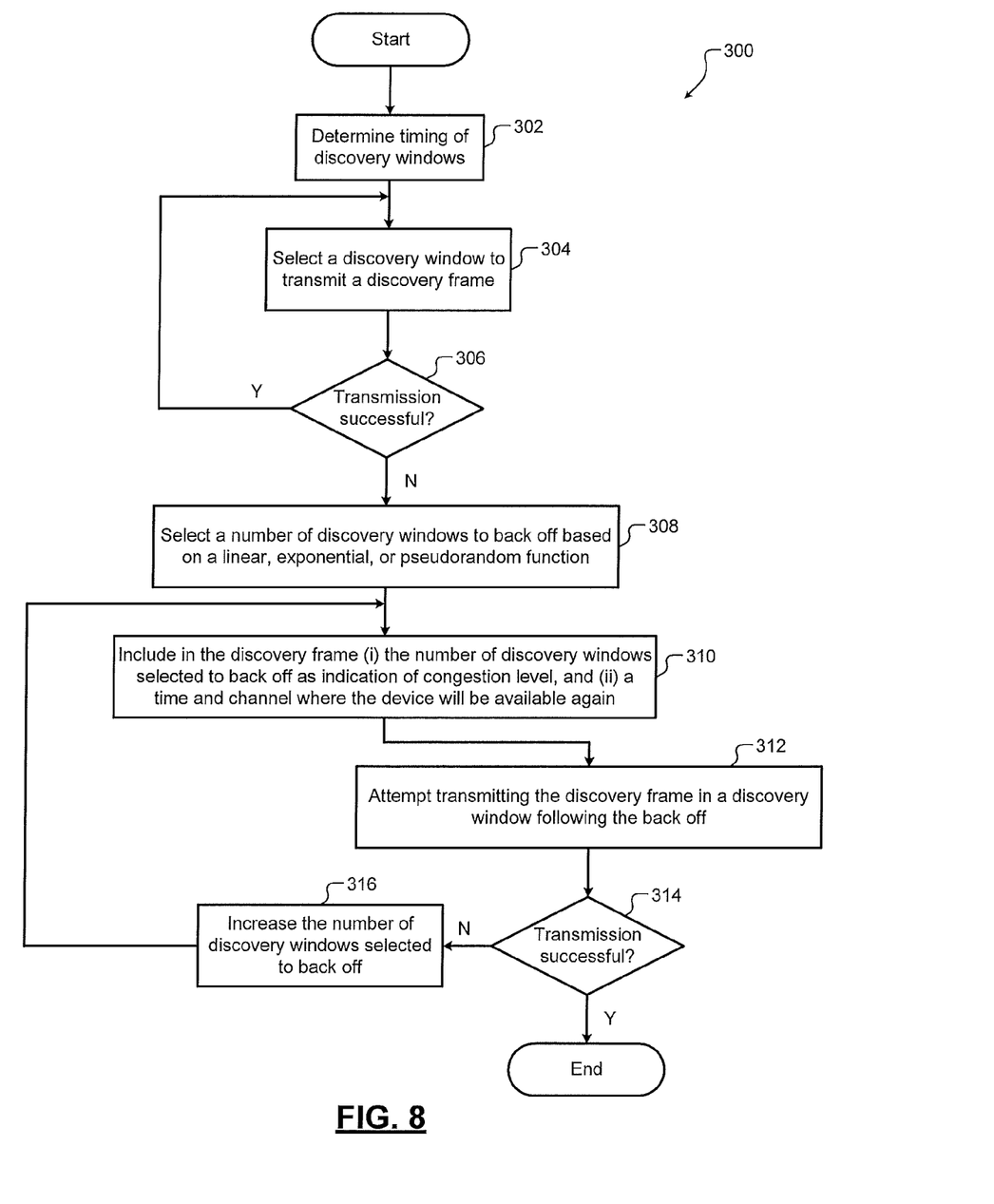
FIG. 8 shows a flowchart of a method for controlling congestion in discovery windows in a NAN.

FIG. 8 shows a method 300 for controlling congestion in discovery windows in a NAN. At 302, control determines a timing of discovery windows in a NAN cluster of NAN devices based on timing and synchronization signals such as NAN sync beacons received from the NAN devices in the NAN cluster. At 304, control selects a discovery window to transmit a discovery frame. At 306, control determines whether the transmission was successful. Control continues by selecting a next discovery window to transmit a next discovery frame or for performing a follow up communication if the transmission was successful. At 308, if the transmission was not successful, control selects a predetermined number of discovery windows to back off. Control selects the predetermined number of discovery windows to back off based on a linear function, and exponential function, or a pseudorandom function.

At 310, control includes the following indications in the discovery frame to be transmitted. Control includes a count of the predetermined number of discovery windows as an indication of the level of congestion. Control also includes a predetermined time and a channel where the NAN device will become available again for follow-up communication. At 312, control attempts to retransmit the discovery frame in a discovery window following the predetermined number of discovery windows skipped for back off. At 314, control determines if the transmission was successful. At 316, if the transmission was not successful, control increases the number of discovery windows to back off, and control returns to 310.

The following are some examples of NANs. NANs can be used in many situations. For example, NANs can be used for social gaming where users of NAN devices can find and play social games with other garners having similar interest and skills. For example, consider the following scenario. Adam is a teenager. He loves playing Player-vs-Player First Person Shooter games, especially with people of his own age who have a similar skill level. Adam loads the latest game and enters his profile and skill level into his device. When he is interested in meeting people to play against and is in a suitable area, he sets an application to notify him when a match is found nearby. To form a match, another user must be found who is interested in playing the same game, with someone of Adam's skill level, and who is not already playing against someone else (since it is a 2-player game). When a match is made, both users are notified and have the option of starting a game, chatting, exchanging in-game content (like weapons), or ignoring the notification. Adam or his potential partners may have active Wi-Fi infrastructure sessions in progress.

A NAN allows a user like Adam to autonomously detect and be able to run the same game application with other garners in proximity having similar interest and gaming skills. The NAN enhances the gameplay if the players are in visual range, which makes proximity a major criterion for partner choice. The following sequence of events can occur in the above scenario. First, a user (e.g., Adam) configures his/her mobile device to alert him/her when other gamers having similar interest and skill-set and sharing the same gaming application are in the proximity defined by the user. Next, the user activates the application to subscribe and detect other gamers that may be in proximity, while publishing the user's gaming profile data. Upon detection, the related garners are alerted and can decide whether to set a connection for playing the game, share gaming hints and exchange "weapons". In parallel, the user's device continues with the subscribing and publishing operation for detecting additional gamers that may be in vicinity.

The following is a summary of NAN features that help accomplish the above sequence of events. Publishing and subscribing operations allow applications to exchange enough data to find a match between two users, who do not know each other, based on shared interests and other qualifying criteria. Devices control the range at which they can be discovered or they can discover. The publishing and subscribing operations are autonomous and concurrent. The publishing and subscribing operations are power efficient to minimize impact on the battery life of the devices. The publishing and subscribing operations continue and work in the background to detect other potential gamers in proximity even if a gaming application is already launched between users.

In another example, NANs can be used to meet colleagues and friends at conferences and exhibitions. For example, consider the following scenario. Sally works for a telephone company. She travels to a Mobile World Congress for a set of meetings. Before arriving at the show, she downloads a specific application to alert her when company colleagues are in the vicinity. She also has the application set to alert her when friends are nearby. Later, when walking along in the show, she gets alerts when old friends or work colleagues from different work locations are nearby even if she was not previously aware they were visiting the show. This gives her the opportunity to launch a separate instant messenger (IM) chat application with these people, arrange to meet with them, exchange valuable data with them, or simply say hello to them. Sally and her friends or work colleagues with whom she would be like contact may have active Wi-Fi infrastructure sessions in progress.

NANs allow a user like Sally to autonomously detect, be alerted, and create connections with friends and colleagues. The following sequence of events can occur in the above scenario. First, a user (e.g., Sally) configures an application on his/her mobile device to alert him/her when colleagues and friends (people with whom the user shares an existing connection) using the same application are in proximity. Next, the user activates the application to subscribe for colleagues and friends while publishing the user's own presence. Other users may not be looking for colleagues and friends but just publishing their presence. The user is alerted upon detecting another known user's device. Once alerted, the user can decide to set up a connection and then launch any number of peer-to-peer (P2P) applications to connect and share data. In parallel to the connection establishment, the user's mobile device continues with the subscribing and publishing operations to determine if other people of interest are nearby.

The following is a summary of NAN features that help accomplish the above sequence of events. The publishing and subscribing operations are accessible by applications, which allow exchange of enough information to recognize that a nearby device is running compatible applications, and which identify the user via an application-specific user identity. The publishing and subscribing operations are autonomous, concurrent, and power efficient to minimize impact on the device's battery life. The NAN features include the ability to efficiently discover in crowded places and in a noisy radio frequency (RF) environment, the ability to discover in the time it takes people to walk close to each other, the ability to run multiple applications at the same time, the ability to publish and subscribe per group in situations where many people are running the same application. The publishing and subscribing operations continue and work even if a Wi-Fi connection is established. A large number of devices publishing cause minimal disruption to other Wi-Fi Networks.

In another example, NANs can be used for team coordination. For example, consider the following scenario. A presidential campaign is in full swing. Campaign manager Steve needs an effective tool to coordinate among his team for security, press briefings, etc., during a campaign event. An independent network (i.e., a NAN) is formed that is restricted to members of Steve's team for cooperation and control. The information passed between members of Steve's team is protected from snooping and disruption. The following sequence of events can occur in this scenario. The devices are preconfigured with information necessary to recognize and join a secure group. Team member's devices join a network in response to a private publication by the team leader. Members of the team receive identifying messages and set up a secure data connection to communicate with any member of the team. Devices send out messages at regular intervals to the NAN participants, identifying team member, location, and current activity. Devices may move in and out of range of each other.

The following is a summary of NAN features that help accomplish the above sequence of events: rapid initialization of the network, low power consumption for transmission of identifying information from each device, restricted access to information in the network both for setup and ongoing activity, and the ability to publish and subscribe per group. Additionally, members of the network authenticate each other before sending data to each other. Communication between members is secure. The range of communication of each device is approximately a few hundred meters.

In another example, NANs can be used for photo sharing at an event. For example, consider the following scenario. Several people who attend a game or concert event would like to share some of the pictures they have taken with other people nearby. The following sequence of events can occur in this scenario. A person, who wants to share some pictures with others nearby, publishes picture sharing. A person, who wants to view the pictures taken in the event, subscribes for picture sharing. Once there is a match between a publishing device and a subscribing device, the devices initiate a data connection to obtain photos. The following is a summary of NAN features that help accomplish this sequence of events. A large number of users simultaneously publish and subscribe. Transmission of advertisements is frequent enough and yet keeps devices on a low duty cycle to save power. Advertising devices receive requests for connection and respond rapidly without sacrificing power consumption. Searching devices receive a response from an advertising device without transmitting several requests. Publishing and subscribing by a large number of devices does not impact other Wi-Fi networks. Multiple NAN discovery sessions are maintained.

In another example, NANs can be used in a farmer's market. For example, consider the following scenario. Robert walks into San Diego's farmers' market that hosts hundreds of farmers from the southwest states and Mexico. Robert uses his smartphone to inform him of the available produce and find good deals. As Robert walks through the farmers' market, his smartphone continually displays newly discovered products. If a product that Robert likes appears, Robert can immediately obtain further information such as price and other attributes of the product. The following sequence of events can occur in this scenario. Robert enters the farmers' market and subscribes to products in the market. As Robert moves through the farmer's market, his smartphone receives published information from the vendors and displays information which matches to his subscription. Robert may query for price and other information of a particular item and receives the necessary information.

The following is a summary of NAN features that help accomplish the above sequence of events. Searching devices discover a large number of simultaneously publishing devices. Searching device rapidly discover the publishing devices as the searching devices come within the range of the publishing devices. A searching device queries a selected publishing device for further information. Publishing devices have low power consumption while continually publishing. Searching devices rapidly find new devices as the searching devices come within the range of the publishing devices while ensuring low power consumption during the operation. The range of communication between devices extends to approximately 100 to 200 meters. Nearly 100's-1000's of NAN devices (advertising and searching) simultaneously operate within an area of approximately 31,000 square meters or less. Multiple NAN discovery sessions are maintained.

In another example, NANs can be used to publish an advertisement to passersby at a harbor of a fishing village. For example, consider the following scenario. Obuasi is a fisherman on a fishing village on the coast of Ghana in Africa. He is fishing every day until he gets enough fish to sell. Obuasi returns to harbor and publishes an advert with his mobile phone. The advert says Obuasi has fresh fish available, even swordfish today. People in the nearby areas can see the advert and come to the harbor to buy fresh fish. Obuasi lives the whole week on the harbor where there is no electricity. He can charge his phone on weekends only.

NANs allow a fisherman such as Obuasi to publish fish adverts and users to be prompted about the sale without having to do any specific action. The following sequence of events can occur in this scenario. A user of a mobile phone in the harbor such as Obuasi configures a message to be published. The mobile phone publishes a message about food/fish advert. At some point in time, a user of a second mobile phone has configured his phone to gather locally published food/fish adverts. The power penalty of both publishing and subscribing is low enough that the battery life of both mobile phones is affected very little. The second mobile phone finds the food/fish advert and may alert the user. The following is a summary of NAN features that help accomplish this sequence of events. The publishing and information subscription are power efficient. The messages are reachable by recipients within approximately a couple of hundred meters. The mechanism minimizes impact on other Wi-Fi networks.

In another example, NANs can be used to publish an advertisement to passersby at a bakery. For example, consider the following scenario. Mehdi has a small bakery in suburban Teheran. He has made special bread in volumes today since it is 10th anniversary day of his bakery. Mehdi celebrates the special event and publishes locally an advertisement on special bread. People moving in nearby areas see the published adverts on their mobile phones if they have subscribed to local food/bread offers.

NANs allow storekeepers such as Mehdi to maintain closed networks and users to be prompted about sales without having to do any specific action. The following sequence of events can occur in this scenario. A user of a computer in a shop such as a bakery configures a message to be published. The computer publishes a message about food advert. At some point in time, a user of a mobile phone has configured his mobile phone to gather locally published food adverts. The power penalty of subscribing is low enough that the battery life of the subscriber's mobile phone is not significantly affected. The subscriber's mobile phone finds the computer's food advert and alerts the user. The following is a summary of NAN features that help accomplish this sequence of events. The publishing and information subscription are power efficient. The messages are reachable by recipients within approximately a couple of hundred meters. The mechanism minimizes impact on other Wi-Fi networks.

In another example, NANs can be used to publish a personal note locally. User devices with user interface capable of typing a published message and/or viewing a received message (e.g. mobile phones) can participate. For example, consider the following scenario. Mark is on skiing holiday in the Alps with his friend Pal. Mark and Pal were downhill skiing during the day time. Mark and Pal would like to do curling in the curling hall later that night. Mark and Pal would need a couple of more people to join them; otherwise curling makes no sense. Mark and Pal decide to take a relaxing moment in the hotel lobby, and Mark sets his mobile phone to publish their wish to get some people to join curling later at night: "Come to BestWest lobby to join curling by 6 PM! Mark & Pal". People in nearby areas can see that someone in the proximity would like to get company to curling game in the evening if they have subscribed to such personal notes or event invitations.

The following sequence of events can occur in the above scenario. A user of phone 1 configures a message to be published. Phone 1 publishes a message. A user of phone 2 has configured his phone to gather locally published messages. Phone 2 finds that phone 1 has published a message. Phone 2 alerts the user. The following is a summary of NAN features that help accomplish this sequence of events. The publishing and information subscription should be power efficient. The messages are reachable by recipients within approximately a couple of hundred meters. The mechanism minimizes impact on other Wi-Fi networks.

In another example, NANs can be used for gaming. User devices with user interface capable of typing a published message and/or viewing a received message (e.g. mobile phones) can participate. For example, consider the following scenario. Nobuyuki (Nobu) sits on a bus seat. He has almost half an hour to his destination. Nobu publishes with his mobile phone his wish to play mobile Street Fighter with anyone. Cho sits in the same bus with Nobu. Cho does not know Nobu. Cho has also published a wish to play Street Fighter. Nobu's and Cho's mobile phones notify about someone in the area is willing to play. Cho's mobile phone sends an invitation to play. Nobu's mobile phone informs Nobu about possibility to play. Nobu accepts the invitation, and the game begins.

The following sequence of events can occur in the above scenario. The user of phone 1 configures his mobile phone to publish willingness to play game. Phone 1 publishes a message. The user of phone 2 has configured her phone to search locally if someone is willing to play. Phone 2 finds that phone 1 has published a willingness to play. The user of phone 2 is notified of this. The user of phone 2 activates the game, and the user of phone 1 is notified. Phone 1 and phone 2 are configured to run the game. The following is a summary of NAN features that help accomplish this sequence of events. The publishing and information subscription should be power efficient. The mechanism minimizes impact on other Wi-Fi networks. Neighbor Awareness Networking fulfills these requirements.

In another example, NANs can be used to collect information about exhibits at an exhibition. For example, consider the following scenario. Hari visits a Museum of Art. As Hari walks through the museum, Hari uses his mobile phone to obtain information about each of the paintings he views. When Hari moves close to a painting, his phone automatically displays information about the painting. Hari would also like to know the specials in the stores and cafeterias at the museum. The following sequence of events can occur in this scenario. Hari comes close to a painting that has a device transmitting a short message with a URL. Hari's mobile phone discovers the message and uses the URL in the message to obtain information about the painting. Alternatively, Hari's mobile phone determines the painting it is closest to and selects that painting's message to obtain further information. When Hari moves away from the painting to another painting, his mobile phone stops displaying information about the former painting and begins displaying information about the next painting. Hari's mobile phone also continually displays information about specials at the museum Café. The following is a summary of NAN features that help accomplish this sequence of events. Devices control the range at which they can be discovered. A searching device controls the range of devices it wants to discover. Devices find discovery messages while retaining a low power duty cycle. Devices with different ranges coexist. Multiple NAN discovery sessions are maintained.

In another example, NANs can be used for advertisement and coupon discovery in a shopping mall. For example, consider the following scenario. In a shopping mall, a shopper receives an advertisement and/or a coupon which he/she is interested in. Jane is shopping in a shopping mall having many stores of many categories. Instead of entering stores one by one on foot to find some good deals, she receives, displayed on her mobile device, her interesting stores' directory information (such as the stores' service, name, and location). The information is broadcast by one or more advertising devices deployed by the operator of the mall or the store. The following sequence of events can occur in this scenario. At some point in time, a shopper such as Jane has configured her phone to gather her interested advertisement or coupon information via an application. Her device then scans the channel to discover the interested advertisement or coupon information. When the device discovers the interested advertisement or coupon, the device alerts the shopper and displays the information. The shopper may initiate a query to obtain more detailed information based on her interests. The following is a summary of NAN features that help accomplish this sequence of events. The searching device timely discovers all interested advertisement or coupon as the user enters a shopping mall. The searching device minimizes power consumption even when many advertisements and/or coupons are pushed in the air. Additional use cases are anticipated and will become apparent to ordinarily skilled artisans from the above disclosure.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A wireless device comprising:
   a selection module configured to select a first discovery window from a plurality of discovery windows in which to transmit a discovery frame, wherein a discovery window is a time period in which (i) the wireless device and (ii) one or more wireless devices in a network are configured to transmit discovery frames to discover a service in the network prior to associating with each other, wherein the discovery frame includes (i) a publish message to make information about capabilities and services of the wireless device available to other devices or (ii) a subscribe message to gather information about capabilities and services of other devices;
   a transmit module configured to attempt to transmit the discovery frame in the first discovery window; and
   a back off module configured to back off for one or more of the plurality of discovery windows subsequent to the first discovery window in response to the transmit module being unable to transmit the discovery frame in the first discovery window,
   wherein, in response to the transmit module being unable to transmit the discovery frame in the first discovery window, the transmit module is configured to
      attempt to transmit the discovery frame in a second discovery window following the backing off of the one or more of the plurality of discovery windows, and
      include, in the discovery frame transmitted in the second discovery window, a count representing a number of the one or more of the plurality of discovery windows, wherein the count indicates of a level of congestion in the network, and
      wherein in response to receiving the discovery frame, the one or more wireless devices in the network adjust respective back off times based on the count to reduce the level of congestion in the network.

2. The wireless device of claim 1, wherein the back off module is configured to select the one or more of the plurality of discovery windows using a linear function, an exponential function, or a pseudorandom function.

3. The wireless device of claim 1, wherein the transmit module is configured to:
   transmit the discovery frame in a first channel; and
   transmit an indication of one or more of (i) a time or (ii) a second channel where the wireless device is configured to become available to communicate subsequent to transmitting the discovery frame,
   wherein the second channel is different from the first channel.

4. The wireless device of claim 3, wherein the first channel and the second channel are in the same frequency band.

5. The wireless device of claim 3, wherein the first channel and the second channel are in different frequency bands.

6. The wireless device of claim 1, wherein the transmit module is configured to transmit information about the service in the discovery frame in response to the one or more wireless devices transmitting a request for the information about the service.

7. The wireless device of claim 1, wherein the transmit module is configured to (i) transmit information about the service in the discovery frame or (ii) transmit a request for the information in the discovery frame.

8. The wireless device of claim 1, further comprising:
a receive module configured to receive one or more synchronization frames from the one or more wireless devices; and
a timing module configured to determine a timing of the plurality of discovery windows based on the one or more synchronization frames received from the one or more wireless devices.

9. The wireless device of claim 1, further comprising:
a power saving module configured to transition the wireless device from an active mode to a power save mode during the one or more of the plurality of discovery windows; and
a wake up module configured to transition the wireless device from the power save mode to the active mode prior to the second discovery window.

10. The wireless device of claim 1, wherein the transmit module is configured to transmit the discovery frame as (i) a multicast frame to the one or more wireless devices or (ii) a unicast frame to a first wireless device of the one or more wireless devices.

11. A method comprising:
selecting a first discovery window from a plurality of discovery windows in which to transmit a discovery frame from a wireless device, wherein a discovery window is a time period in which (i) the wireless device and (ii) one or more wireless devices in a network are configured to transmit discovery frames to discover a service in the network prior to associating with each other, wherein the discovery frame includes (i) a publish message to make information about capabilities and services of the wireless device available to other devices or (ii) a subscribe message to gather information about capabilities and services of other devices;
attempting to transmit the discovery frame in the first discovery window;
backing off for one or more of the plurality of discovery windows subsequent to the first discovery window in response to being unable to transmit the discovery frame in the first discovery window;
in response to being unable to transmit the discovery frame in the first discovery window, (i) attempting to transmit the discovery frame in a second discovery window following the backing off of the one or more of the plurality of discovery windows, and (ii) including, in the discovery frame transmitted in the second discovery window, a count representing a number of the one or more of the plurality of discovery windows, wherein the count indicates of a level of congestion in the network; and
in response to receiving the discovery frame, adjusting respective back off times of the one or more wireless devices in the network based on the count to reduce the level of congestion in the network.

12. The method of claim 11, further comprising selecting the one or more of the plurality of discovery windows using a linear function, an exponential function, or a pseudorandom function.

13. The method of claim 11, further comprising:
transmitting the discovery frame in a first channel; and
transmitting an indication of one or more of (i) a time or (ii) a second channel where the wireless device is configured to become available to communicate subsequent to transmitting the discovery frame,
wherein the second channel is different from the first channel.

14. The method of claim 13, wherein the first channel and the second channel are in the same frequency band.

15. The method of claim 13, wherein the first channel and the second channel are in different frequency bands.

16. The method of claim 11, further comprising transmitting information about the service in the discovery frame in response to the one or more wireless devices transmitting a request for the information about the service.

17. The method of claim 11, further comprising:
transmitting information about the service in the discovery frame; or
transmitting a request for the information in the discovery frame.

18. The method of claim 11, further comprising:
receiving one or more synchronization frames from the one or more wireless devices; and
determining a timing of the plurality of discovery windows based on the one or more synchronization frames received from the one or more wireless devices.

19. The method of claim 11, further comprising:
transitioning the wireless device from an active mode to a power save mode during the one or more of the plurality of discovery windows; and
transitioning the wireless device from the power save mode to the active mode prior to the second discovery window.

20. The method of claim 11, further comprising transmitting the discovery frame as (i) a multicast frame to the one or more wireless devices or (ii) a unicast frame to a first wireless device of the one or more wireless devices.

* * * * *